# United States Patent
Yokoyama

(10) Patent No.: US 9,928,933 B2
(45) Date of Patent: Mar. 27, 2018

(54) ELECTRICAL DEVICE, AND METHOD FOR ARRANGING CONDUCTIVE MEMBER

(71) Applicant: CANON KABUSHIKI KAISHA, Tokyo (JP)

(72) Inventor: Junnosuke Yokoyama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/201,165

(22) Filed: Jul. 1, 2016

(65) Prior Publication Data
US 2017/0033543 A1 Feb. 2, 2017

(30) Foreign Application Priority Data

Jul. 30, 2015 (JP) ................................. 2015-150513

(51) Int. Cl.
*H02G 15/04* (2006.01)
*H01B 1/12* (2006.01)
*H02G 3/32* (2006.01)

(52) U.S. Cl.
CPC ................ *H01B 1/12* (2013.01); *H02G 3/32* (2013.01)

(58) Field of Classification Search
CPC .......... H01B 7/02; H01B 7/207; H01B 7/295; H01R 4/64; H01R 4/70; H02G 5/06; H02G 4/76
USPC ...... 174/74 R, 78, 84 R, 75 R, 110 R, 113 R
See application file for complete search history.

(56) References Cited

U.S. PATENT DOCUMENTS

| 4,857,668 | A | * | 8/1989 | Buonanno | H05K 9/0015 174/354 |
| 5,045,635 | A | * | 9/1991 | Kaplo | H02B 1/16 174/354 |
| 5,202,536 | A | * | 4/1993 | Buonanno | H05K 9/0015 174/356 |
| 5,511,798 | A | * | 4/1996 | Kawamoto | H02B 1/305 174/358 |
| 5,569,877 | A | * | 10/1996 | Yumi | H05K 9/0015 174/354 |
| 5,712,449 | A | * | 1/1998 | Miska | H05K 9/0015 174/356 |
| 6,101,711 | A | * | 8/2000 | Kobayashi | H05K 9/0018 29/825 |
| 6,399,880 | B1 | * | 6/2002 | Bedrosian | H05K 9/0015 174/358 |
| 6,469,244 | B1 | * | 10/2002 | Harrison | H05K 9/0018 174/360 |
| 6,713,672 | B1 | * | 3/2004 | Stickney | H05K 9/0018 174/382 |
| 6,906,255 | B2 | * | 6/2005 | Inoke | H05K 9/0016 174/368 |

(Continued)

FOREIGN PATENT DOCUMENTS

JP 2012-54458 A 3/2012

*Primary Examiner* — William H Mayo, III
(74) *Attorney, Agent, or Firm* — Canon U.S.A., Inc. IP Division

(57) ABSTRACT

The present disclosure relates to an electrical device, and a method for arranging a conductive member. A conductive member is arranged to contact the ground portion electrically grounded and the electric wire attached to the ground portion by a first attachment member and a second attachment member. The conductive member is arranged between the first attachment member and the second attachment member.

11 Claims, 8 Drawing Sheets

(56) References Cited

U.S. PATENT DOCUMENTS

| | | | | |
|---|---|---|---|---|
| 7,081,292 B2* | 7/2006 | Kaplo | ............... | H05K 9/0015 |
| | | | | 174/392 |
| 7,808,775 B2* | 10/2010 | Cherney | ............ | H05K 7/1432 |
| | | | | 174/70 B |
| 8,665,160 B2* | 3/2014 | Uttermann | ............ | H01Q 1/243 |
| | | | | 343/702 |
| 2010/0276193 A1* | 11/2010 | Liu | ............ | H01F 10/138 |
| | | | | 174/353 |
| 2013/0032381 A1* | 2/2013 | Hiyama | ............ | H05K 1/028 |
| | | | | 174/254 |
| 2013/0223836 A1* | 8/2013 | Gibbs | ............ | H01Q 9/42 |
| | | | | 396/535 |

* cited by examiner

ELECTRICAL DEVICE, AND METHOD FOR ARRANGING CONDUCTIVE MEMBER

BACKGROUND OF THE INVENTION

Field of the Invention

The present invention relates to an electrical device, and a method for arranging a conductive member.

Description of the Related Art

A signal to be transmitted has increased in speed in an electric wire connected inside and outside an electrical device. Therefore, a measure not to release high-frequency radiation noise (hereinafter referred to as an Electromagnetic Interference (EMI) measure) has been required.

A wireless device has increasingly been loaded into the electrical device. Therefore, a measure to make the electrical device normally operate even if exogenous noise is received (hereinafter referred to as an Electromagnetic Susceptibility (EMS) measure) has been required.

To meet both characteristics of the EMI and EMS measures (referred to as Electromagnetic Compatibility (EMC)), a shielding measure to cover an electric wire with a metal shield has been taken.

It is desirable for EMC to reliably ground a shield portion of an electric wire, which has been shielded, to a Ground (GND) sheet metal in the electrical device by pressing and fixing the electric wire on the GND sheet metal in the electrical device. Even if a shielding member has blocked radiated noise or exogenous noise, when a current caused by an electric field or a magnetic field received in the shield portion stays without flowing to a GND, the current generates an electric field or a magnetic field.

In an image forming apparatus discussed in Japanese Patent Application Laid-Open No. 2012-54458, engagement portions in a pressing retainer made of a metal wire are fitted into respective engagement holes provided on both sides of a supporting member made of a metal plate serving as a member constituting the apparatus to engage therewith, to fix a flexible flat cable to the supporting member.

Examples of an electric wire connected inside or outside the electrical device include an electric wire having a rounded shape in addition to an electric wire having a flat shape like a flexible flat cable.

When the electric wire connected inside or outside the electrical device is attached to a ground portion such as a GND sheet metal using two attachment members, a distance between the ground portion and the electric wire increases depending on a shape of the electric wire that has been shielded. When the electric wire too separates from the ground portion electrically grounded, the electromagnetic wave released from the electric wire cannot be suppressed.

SUMMARY OF THE INVENTION

The present invention is directed to providing an apparatus in which a conductive member is arranged to contact an electric wire attached to a ground portion by a first attachment member and a second attachment member, and the ground portion, and is arranged between the first attachment member and the second attachment member, and a method therefor.

According to an aspect of the present invention, an electrical device includes a ground portion electrically grounded, and a conductive member arranged to contact an electric wire attached to the ground portion by a first attachment member and a second attachment member, and the ground portion, and arranged between the first attachment member and the second attachment member.

Further features of the present invention will become apparent from the following description of exemplary embodiments with reference to the attached drawings.

DESCRIPTION OF THE EMBODIMENTS

Exemplary embodiments of the present invention will be specifically described below with reference to the accompanying drawings. The following exemplary embodiments are not intended to limit the invention according to the scope of claims, and all of combinations of features described in the exemplary embodiments are not necessarily essential for a solution to the invention.

In a first exemplary embodiment, a conductive member is arranged to contact a ground portion electrically grounded and an electric wire attached to the ground portion by a first attachment member and a second attachment member. The conductive member is arranged between the first attachment member and the second attachment member. When the electric wire is thus grounded, an electromagnetic wave released from the electric wire is suppressed.

The present invention will be specifically described below.

Figure 1:
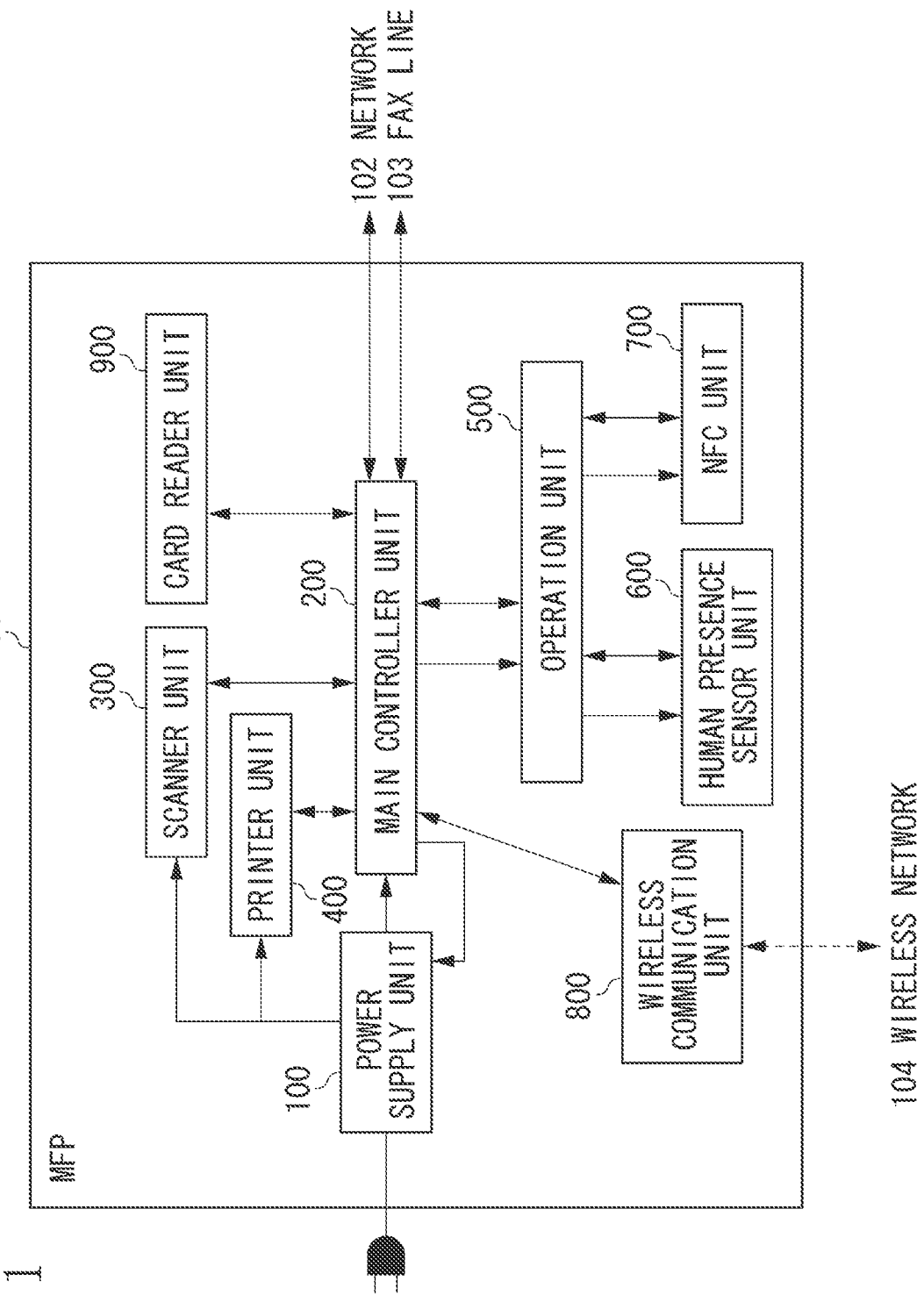
FIG. 1 is a block diagram illustrating a hardware configuration of a multi functional peripheral (MFP) according to the present exemplary embodiment.

A hardware configuration of a multi functional peripheral (MFP) 10 serving as an example of an electrical device according to a first exemplary embodiment of the present invention will be described with reference to a block diagram of FIG. 1.

The MFP 10 has a copy function for reading a document to generate image data and printing an image on a sheet based on the generated image data. The MFP 10 has a personal computer (PC) print function for receiving a print job from an external device such as a PC or an external server and printing characters and an image on a sheet based on data representing a received print instruction. The MFP 10 has a facsimile (FAX) print function for receiving a FAX job from a FAX and printing characters and an image on a sheet based on data representing the received FAX job. Printing using the print function may be color printing or monochrome printing.

The PC generates image data with application software and transmits the generated image data to the MFP 10, for example. The PC generates Page Description Language (PDL) data using a printer driver, for example. A main controller unit 200 in the MFP 10 rasterizes the PDL data sent from the PC via a network 102, to generate bit map data.

The main controller unit 200 is connected to the external device such as the PC or the external server via the network 102, and performs processing such as the receiving of the print job from the external device. The network 102 may be a Local Area Network (LAN) or a Wide Area Network (WAN) such as the Internet.

The main controller unit 200 is connected to the FAX via a FAX line 103, to perform processing such as the receiving of the FAX job from the FAX.

The main controller unit 200 in the MFP 100 is connected to a scanner unit 300 serving as an image input device and a printer unit 400 serving as an image output device, and controls input and output of image information.

The scanner unit 300 includes an automatic document feeding unit that conveys a document loaded on a document tray and an image reading unit that reads an image on the document using an optical sensor such as a charge-coupled device (CCD) sensor. The image reading unit transfers image data generated by reading the image on the document to the main controller unit 200.

The scanner unit 300 includes a scanner driving portion including a driving portion for moving a reading head that reads a document and a driving portion for conveying the document to a reading position, and a scanner control portion that controls an operation of the scanner driving portion. The scanner control portion receives, through communication with the main controller unit 200, setting information set by a user when scanner processing is performed, to control an operation of the scanner driving portion based on the setting information.

The printer unit 400 prints an image on a sheet based on the image data input from the scanner unit 300, the PC, the external server, or the FAX.

The printer unit 400 forms an image on a sheet according to an electrophotographic method, for example. The printer unit 400 includes a printer driving portion including a motor that rotates a photosensitive drum, a mechanism portion for pressurizing a fixing unit, and a heater, and a printer control portion that controls an operation of the printer driving portion. The printer control portion receives, through communication with the main controller unit 200, setting information set by the user when print processing is performed, to control an operation of the printer driving portion based on the setting information.

The printer unit 400 may print an image on a sheet using an inkjet method, for example, or use other methods (e.g., a thermal transfer method) if the image can be printed on the sheet.

The main controller unit 200 performs integrated operation control of the MFP 10 including the scanner unit 300 and the printer unit 400 in response to an instruction from the user that has been input via an operation unit 500 corresponding to one example of a user interface unit.

The main controller unit 200 performs operation control of a power supply unit 100, to control a power mode of the MFP 10.

The MFP 10 includes a human presence sensor unit 600 for detecting a person who approaches the MFP 10. When the human presence sensor unit 600 detects the person who comes close to the front of the MFP 10, the MFP 10 returns from a power saving mode in which power consumption is low, to a power state where any one of a print function, a scanner function, a copy function, and a FAX function can be used.

The human presence sensor unit 600 is an infrared array sensor, and receives infrared rays radiated from the body temperature of a person using light receiving portions arranged in a line shape or a matrix shape and detects a position of the person and a distance between the person and the MFP 100 using an infrared light receiving intensity distribution.

The operation unit 500 performs an operation of the human presence sensor unit 600 and power supply control. The infrared array sensor and the operation unit 500 are connected to each other via an Inter-Integrated Circuit (I2C) bus.

The human presence sensor unit 600 may be a ultrasonic sensor. The ultrasonic sensor outputs a pulse wave having a frequency of 40 KHz in an inaudible region while receiving a reflected wave of the pulse wave reflected by an object. The ultrasonic sensor measures a distance between the MFP 10 and the object based on a period of time elapsed until it receives the reflected wave since it outputs the pulse wave.

Furthermore, the human presence sensor unit 600 may be an infrared reflection sensor, which receives radiated infrared rays, if it can detect the presence or absence of a person and a change in distance. A capacitance sensor, which measures a distance between a sensor and a target object based on a capacitance between the sensor and the target object, may be used.

Figure 2:
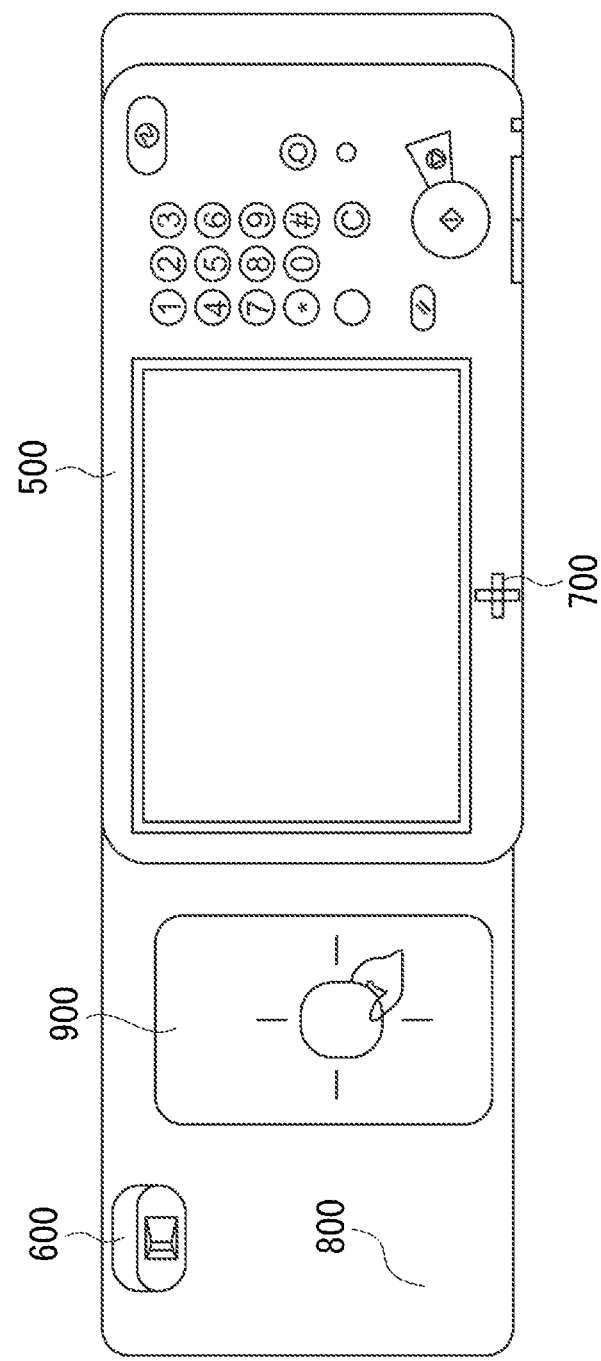
FIG. 2 is an external view in the vicinity of an operation unit in the MFP according to the present exemplary embodiment.

The operation unit 500, the human presence sensor unit 600, a Near Field Communication (NFC) unit 700, a wireless communication unit 800, and a card reader unit 900 in the MFP 10 illustrated in FIG. 2 will be described below with reference to an external view in the vicinity of the operation unit 500.

The MFP 10 includes the NFC unit 700 for performing NFC communication with the external device.

The NFC unit 700 has a reader function for reading information recorded on an authentication card held over the NFC unit 700 and a writer function for writing Internet Protocol (IP) address information and data in the MFP 10 into a mobile device such as a smartphone held over the NFC unit 700, for example. The operation unit 500 performs operation control of the NFC unit 700.

While the NFC unit 700 in the MFP 10 is incorporated into the operation unit 500 in the MFP 10, the NFC unit 700 is arranged in a location near the operation unit 500 that is easily operated by the user.

The wireless communication unit 800 is a module for performing communication between the MFP 10 and the external device via a wireless network 104 (e.g., a wireless local area network (LAN) in an Institute of Electrical and Electronics Engineers (IEEE) 802.11 standard and Bluetooth (registered trademark) in an IEEE 802.15.1 standard). The wireless communication unit 800 is loaded with an antenna portion and a control integrated circuit (IC) that controls communication, and is controlled by being connected to the main controller unit 200.

The wireless communication unit 800 is arranged near the operation unit 500 close to a position where the user stands so that it can perform near field communication with the external device owned by the user.

The operation unit 500 includes a liquid crystal display (LCD) panel, a touch panel, a key portion, which detects a key operation by the user, including a numeric keypad and a start key, and a buzzer.

Image data created and received from a central processing unit (CPU) in the main controller unit 200 is rendered on the LCD panel. When the user touches and operates the touch panel, a touch panel controller analyzes coordinate data at a touched site and notifies a microcomputer in the operation unit 500 of the analyzed coordinate data, and the microcomputer notifies the CPU in the main controller unit 200 of the analyzed coordinate data. The microcomputer in the operation unit 500 also performs operation control of the human presence sensor unit 600 and the NFC unit 700 in addition to input control of the touch panel and the key portion.

The card reader unit 900 is a device for reading an electronic card used for authentication login using an identification (ID) card. The card reader unit 900 transmits read ID information to the main controller unit 200. The card reader unit 900 is used when an ID card, which cannot cope with NFC communication, is used.

Around the operation unit 500, the card reader unit 900 and the wireless communication unit 800 are arranged so that they are easily operated by the user, and the human presence sensor unit 600 is arranged so that the user in the vicinity of the operation unit can be detected. The NFC unit 700 is incorporated into the operation unit 500.

Figure 3:
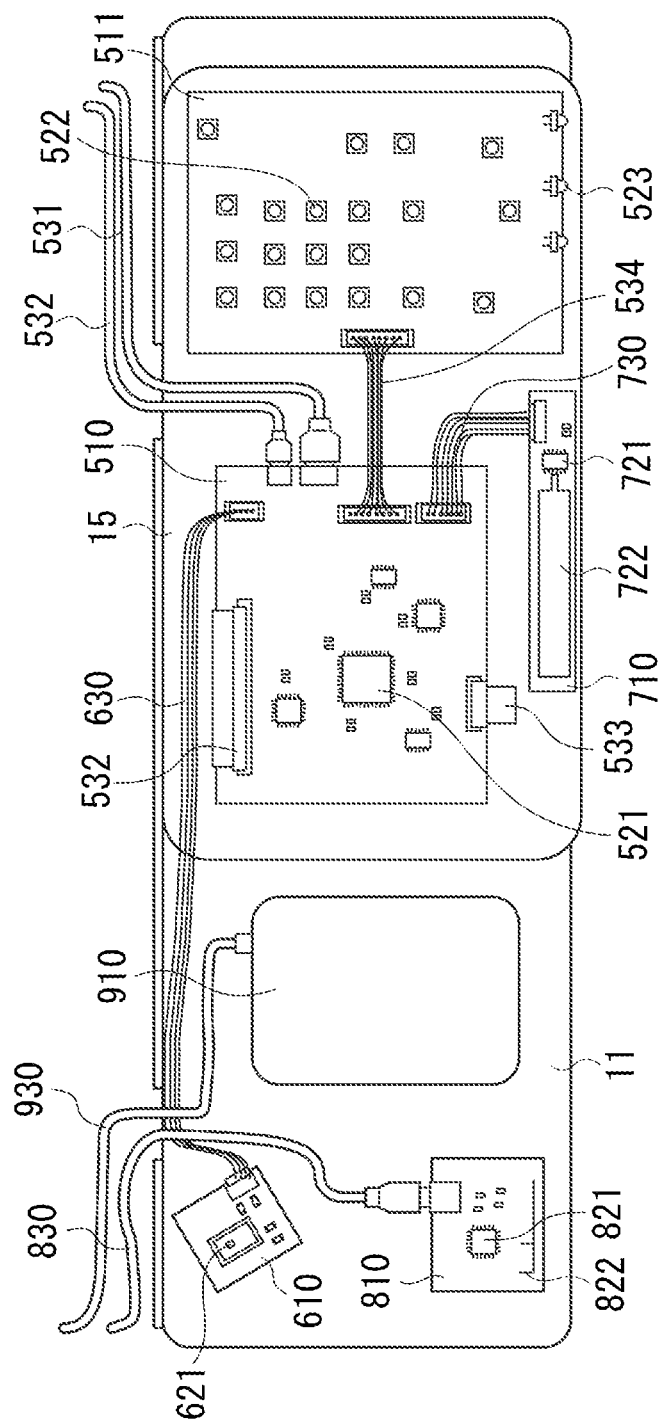
FIG. 3 is an internal arrangement diagram in the vicinity of the operation unit in the MFP according to the present exemplary embodiment.

A configuration of an internal arrangement around the operation unit 500 will be described below with reference to an arrangement diagram of FIG. 3. The arrangement diagram of FIG. 3 illustrates an internal substrate and a cable arrangement.

A human presence sensor substrate 610, a wireless communication substrate 810, a card reader 910, and an operation unit earth sheet metal 15, for example, are loaded on a frame earth sheet metal 11 (hereinafter referred to as an earth sheet metal 11) in the main body of the MFP 10 (i.e., a casing of the electrical device). The earth sheet metal 11 and the operation unit earth sheet metal 15 are one example of a ground portion electrically grounded, or one example of a plate-shaped metal member.

The operation unit earth sheet metal 15 is loaded with an operation unit microcomputer substrate 510, a key substrate 511, an NFC substrate 710, an LCD unit, and a touch panel.

An antenna unit 722 and a control chip 721 are mounted on the NFC substrate 710. The NFC substrate 710 is connected to the operation unit microcomputer substrate 510 via an NFC bundle line 730.

The bundle line means a line obtained by bundling electric wires (electric wires in a bundled state are hereinafter referred to as a "bundle line").

The NFC bundle line 730 has an entire length of approximately 100 mm, for example, because the operation unit microcomputer substrate 510 and the NFC substrate 710 are arranged close to each other, and is attached to the operation unit earth sheet metal 15 inside the operation unit 500. A Serial Peripheral Interface (SPI) bus and a control signal are transmitted to the NFC bundle line 730.

A push switch 522 and a light emitting diode (LED) 523 are mounted on the key substrate 511. The key substrate 511 is connected to the operation unit microcomputer substrate 510 via a key bundle line 534.

The key bundle line 534 has an entire length of approximately 200 mm, for example, because the operation unit microcomputer substrate 510 and the key substrate 511 are arranged close to each other, and is attached to the operation unit earth sheet metal 15 inside the operation unit 500. A control signal representing a state of the push switch 522 is transmitted to the key bundle line 534.

An antenna unit 822 and a control chip 821 are mounted on the wireless communication substrate 810. The wireless communication substrate 810 is connected to the main controller unit 200 via a wireless communication bundle line 830.

The main controller unit 200 is installed on the side of a back surface of the MFP 10. The main controller unit 200 is arranged on the opposite side to the operation unit 500. Therefore, the entire length of the wireless communication bundle line 830 exceeds 1000 mm, for example.

The wireless communication bundle line 830 is a Universal Serial Bus (USB) bundle line, and a shield in the bundle line and a substrate connector shield are connected to each other so that a signal quality is ensured and a measure against noise is taken.

The card reader 910 is a card reader unit. The card reader 910 is connected to the main controller unit 200 by a USB signal.

The card reader 910 is connected to the main controller unit 200 on the side of the back surface of the MFP 10. Thus, a card reader bundle line 930 has its entire length exceeding 1000 mm, for example. However, a shield in the bundle line and a substrate connector shield are connected to each other so that a signal quality is ensured and a measure against noise is taken.

An operation unit microcomputer 521 is mounted on the operation unit microcomputer substrate 510. The operation unit microcomputer substrate 510 controls the NFC substrate 710, the key substrate 511, and the human presence sensor substrate 610.

In the operation unit microcomputer substrate 510, detection data from the touch panel connected to the tip of a touch panel bundle line 533 is also processed. The operation unit microcomputer substrate 510 is also connected to the main controller unit 200, an operation unit bundle line 531, and an operation unit power supply bundle line 532.

The operation unit power supply bundle line 532 supplies power to the operation unit microcomputer substrate 510 from the main controller unit 200.

A serial communication signal between the main controller unit 200 and the operation unit microcomputer 521 and serial data of an image to be rendered on the LCD panel connected to the main controller unit 200 via the operation unit power supply bundle line 532 are transmitted to the operation unit bundle line 531.

The operation unit power supply bundle line 532 and the operation unit bundle line 531 have their entire lengths exceeding 1000 mm, for example, because they are connected to the main controller unit 200 on the side of the back surface of the MFP 10. However, a shield in the bundle line and a substrate connector shield are connected to each other so that a signal quality is ensured and a measure against noise is taken.

An infrared array sensor 621 is mounted on the human presence sensor substrate 610. The human presence sensor substrate 610 is connected to the operation unit microcomputer substrate 510 via a human presence sensor bundle line 630.

The human presence sensor substrate 610 is directed toward the operation unit 500 from a location slightly spaced apart from the operation unit 500 so that it can detect the user who approaches the operation unit 500. This is because when the human presence sensor unit 600 is arranged, the user who approaches from just near the operation unit 500 cannot be detected due to an effect of a viewing angle of the human presence sensor unit 600.

When the operation unit 500 is assembled, the operation unit bundle line 531, the operation unit power supply bundle line 532, and the human presence sensor bundle line 630 need to be inserted afterward into the operation unit microcomputer substrate 510. Thus, the bundle line previously needs to have an extra length to ensure workability. Accordingly, the entire length of the human presence sensor bundle line 630 is as large as approximately 600 mm, for example.

An I2C serial signal and a power supply are transmitted to the human presence sensor bundle line 630. The I2C serial signal is easily affected by EMI and EMS because it is a high-impedance signal.

In the first exemplary embodiment, the wireless communication substrate 810, which generates an electric wave, exists near the human presence sensor substrate 610 and the human presence sensor bundle line 630. Therefore, an electrical device that is affected by EMS is assumed.

In the electrical device according to the first exemplary embodiment, a portion, corresponding to the extra length for inserting the human presence sensor bundle line 630 afterward into the operation unit microcomputer substrate 510, of the human presence sensor bundle line 630 is spaced apart from the earth sheet metal 11.

Furthermore, in the electrical device according to the first exemplary embodiment, a location where a portion other than the portion corresponding to the extra length of the human presence sensor bundle line 630 can be attached to the earth sheet metal 11 is arranged near the card reader 910. More specifically, in the electrical device according to the first exemplary embodiment, the location where the portion other than the portion corresponding to the extra length of the human presence sensor bundle line 630 can be attached to the earth sheet metal 11 is limited to a bent portion at a corner of the earth sheet metal 11.

In the first exemplary embodiment, even an electrical device that cannot provide much grounding space for a bundle line to be connected thereto can provide stable performance for EMI and EMS standards.

More specifically, in the first exemplary embodiment, the conductive member is arranged to contact the ground portion electrically grounded and the electric wire attached to the ground portion by the first attachment member and the second attachment member. The conductive member is arranged between the first attachment member and the second attachment member. When the electric wire is thus grounded, the electromagnetic wave released from the electric wire is suppressed. The present invention will be specifically described below.

A method for shielding the human presence sensor bundle line 630 according to a first exemplary embodiment will be first described with reference to schematic views of FIGS. 4A to 4C.

Figure 4A:
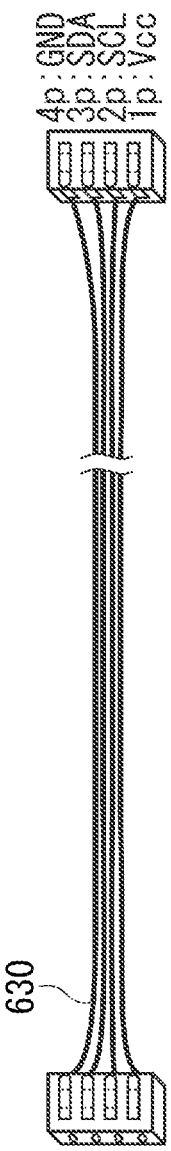
FIGS. 4A, 4B, and 4C are schematic views for illustrating a method for shielding an electric wire according to a first exemplary embodiment.

FIG. 4A illustrates an initial state, and uses a pressure contact connector. In a terminal arrangement, the first pin corresponds to a power supply Vcc, the second pin corresponds to a Serial Clock (SCL) (I2C clock), the third pin corresponds to Serial Data (SDA) (I2C data), and the fourth pin corresponds to a GND.

Figure 4B:
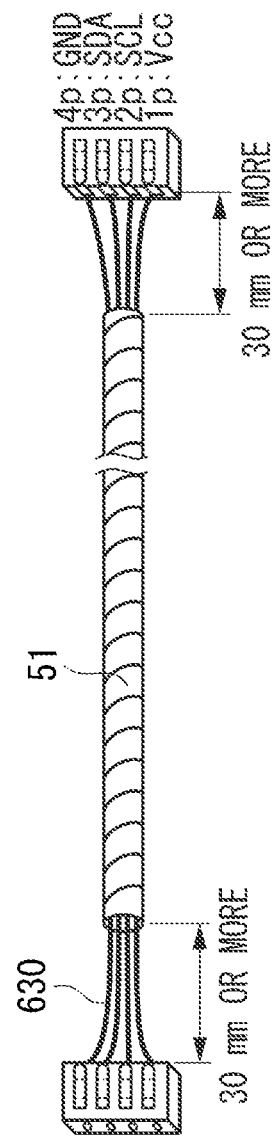

FIG. 4B illustrates a state where a conductive fabric tape 51 serving as an example of a shielding member for shielding an electromagnetic wave is wound around the human presence sensor bundle line 630. A way of winding the conductive fabric tape 51 around the human presence sensor bundle line 630 may be a spiral way of winding illustrated in FIG. 4B or may be a way of winding like a rolled sushi in dried laver seaweed. When the human presence sensor bundle line 630 is inserted into a substrate connector, the conductive fabric tape 51 is spaced approximately 30 mm, for example, apart from a connector portion so that the conductive fabric tape 51 and an eclectic component in a substrate are not short-circuited.

Figure 4C:
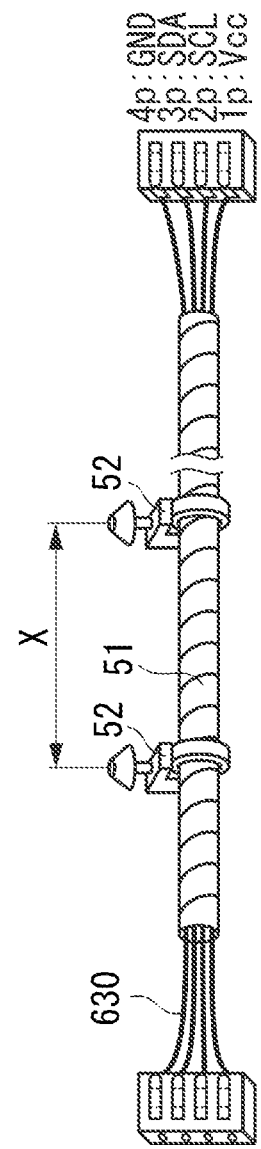

FIG. 4C illustrates a state where the conductive fabric tape 51 is wound around the human presence sensor bundle line 630, and a reuse band 52 is further wound therearound. The reuse band 52 is an example of an attachment member for attaching an electric wire to a ground portion electrically grounded, and need not have conductivity. While an example in which an approximate reuse band is selected as the reuse band 52 depending on the diameter of a bundle line to be used, the diameter of an attachment hole, and the plate thickness of an attachment sheet metal has been described, the reuse band 52 may be of a push mount type that is not reusable.

In the first exemplary embodiment, two reuse bands 52 are used, and a distance X between the reuse bands is determined depending on locations to which the respective reuse bands 52 are attached and the width of a conductor, described below.

The conductive fabric tape 51 may be not a fabric tape but a conductive spiral tube or a braided shield.

A method for grounding the human presence sensor bundle line 630 around which the conductive fabric tape 51 is wound (a bundle line, which has been shielded, is also hereinafter merely referred to as a "bundle line"), according to the first exemplary embodiment will be described below with reference to schematic views of FIGS. 5A to 5B.

In the first exemplary embodiment, conductive gaskets 53 are sandwiched between two holes 12 for attaching the respective reuse bands 52 for attaching the bundle line to ground the bundle line. The conductive gasket 53 is an elastic member, having flexibility and having a cushioning characteristic, composed of a material such as rubber. The conductive gasket 53 is a conductor, and is an example of a conductive member.

A state where the bundle line has not yet been attached to the earth sheet metal 11 will be first described with reference to the schematic view of FIG. 5A.

Figure 5A:
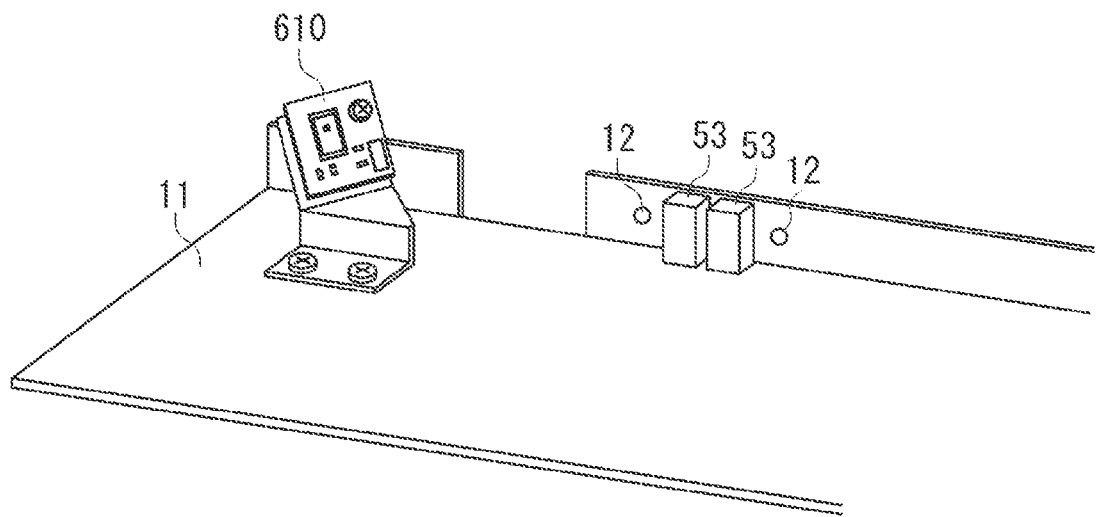
FIGS. 5A and 5B are schematic views for illustrating a method for grounding an electric wire according to the first exemplary embodiment.

In an example illustrated in FIG. 5A, the two holes 12 for attaching the respective reuse bands 52 are opened in the earth sheet metal 11. The two conductive gaskets 53 serving as an example of a conductive member are stuck between the two attachment holes 12. The number of conductive gaskets 53 to be stuck may be one, or may be two or more. The number of conductive gaskets 53 may be changed depending on the area in which the bundle line is to be grounded.

A state where the bundle line has been attached to the earth sheet metal 11 will be then described with reference to the schematic view of FIG. 5B.

Figure 5B:
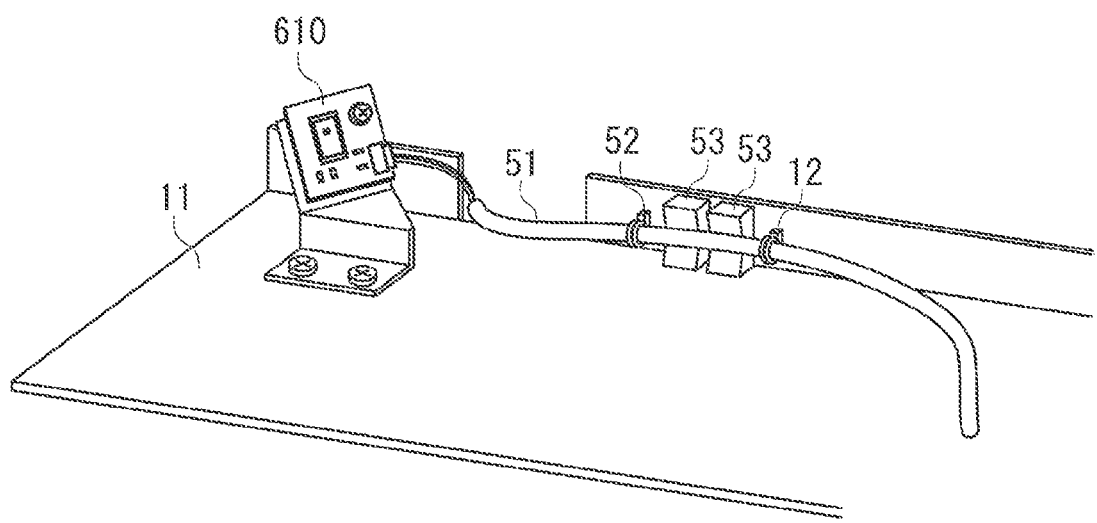

In an example illustrated in FIG. 5B, the two reuse bands 52 are inserted into the respective attachment holes 12, to attach the bundle line with the conductive gaskets 53 sandwiched therebetween. At this time, the conductive gaskets 53 are crushed under pressure from the bundle line attached by the two reuse bands 52, and are sandwiched between the bundle line and the earth sheet metal 11. Thus, the bundle line and the conductive gasket 53 contact each other while the conductive gasket 53 and the earth sheet metal 11 contact each other. A member having conductivity other than the conductive gasket 53 may be used as a modification if it is a conductor that has a cushioning characteristic characterized by being thus crushed. For example, the conductive gasket 53 may be replaced with a urethane foam having conductivity. The urethane foam is a sponge member having flexibility and having a cushioning characteristic.

Respective positions of the bundle line and the conductive gasket 53 according to the first exemplary embodiment will be described below with reference to schematic views of FIGS. 6A to 6D. In each of FIGS. 6A to 6D, an A-A cross section is a cross section viewed from above, and a B-B cross section is a cross section viewed from the side.

Figure 6A:
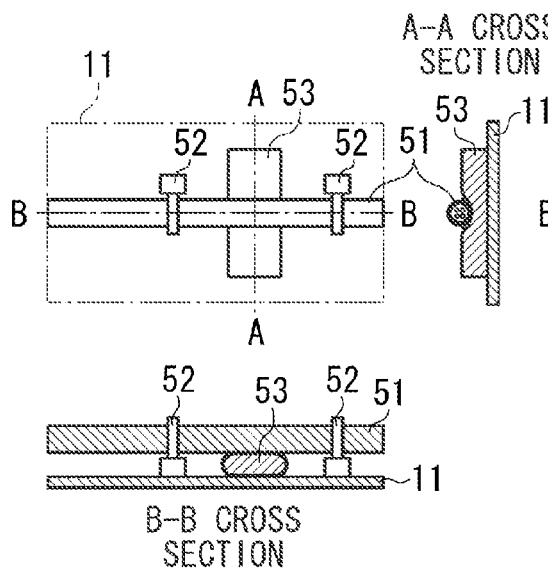
FIGS. 6A, 6B, 6C, and 6D are schematic views for illustrating respective positions of an electric wire and a conductive gasket according to the first exemplary embodiment.
Figure 6B:
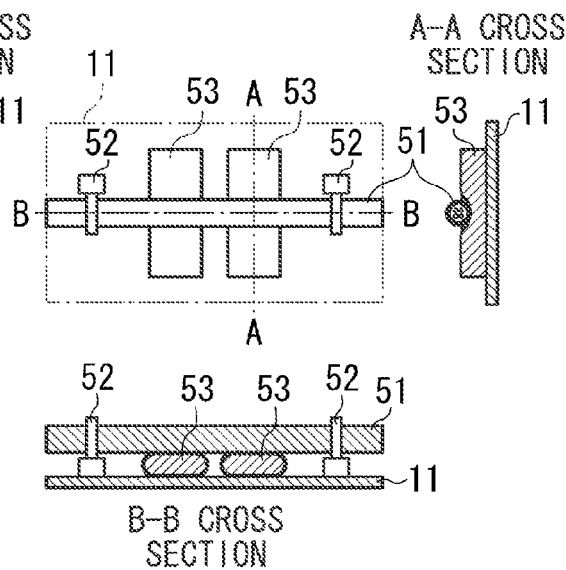
Figure 6C:
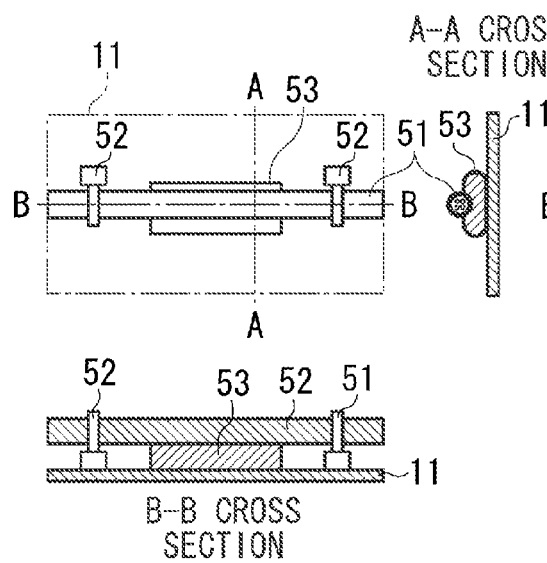

FIGS. 6A and 6C respectively illustrate examples in which the number of conductive gaskets 53 to be attached to the earth sheet metal 11 is one.

FIG. 6A illustrates an example in which the conductive gasket 53 is stuck to be perpendicular to the bundle line.

On the other hand, FIG. 6C illustrates an example in which the conductive gasket 53 is stuck to be parallel to the bundle line.

The area in which the bundle line and the conductive gasket 53 contact each other is larger when they are parallel to each other in FIG. 6C than when they are perpendicular to each other in FIG. 6A. However, in a case illustrated in FIG. 6C, the conductive gasket 53 is not wide enough for the bundle line in an A-A cross section so that the bundle line may come off the conductive gasket 53.

Thus, the bundle line and the conductive gasket 53 can reliably contact each other when perpendicular to each other in FIG. 6A.

Figure 6D:
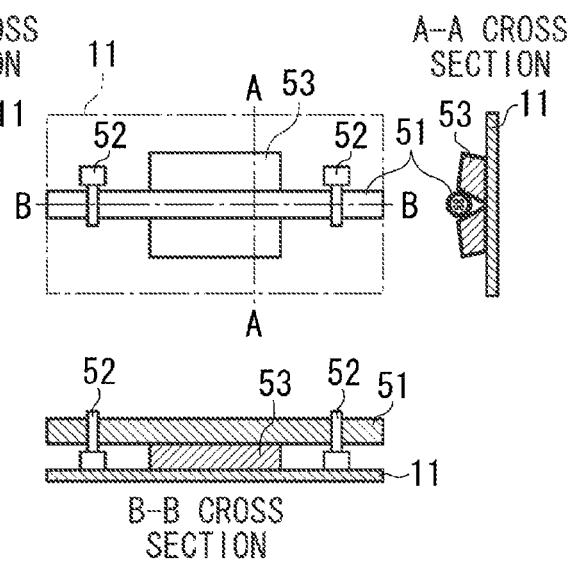

On the other hand, FIGS. 6B and 6D respectively illustrate examples in which the number of conductive gaskets 53 to be attached to the earth sheet metal 11 is two.

FIG. 6B illustrates an example in which the conductive gaskets 53 are stuck to be perpendicular to the bundle line.

On the other hand, FIG. 6D illustrates an example in which the conductive gaskets 53 are stuck to be parallel to the bundle line.

The area in which the bundle line and the conductive gasket 53 contact each other is larger when they are parallel to each other in FIG. 6D than when they are perpendicular to each other in FIG. 6B. However, in a case illustrated in FIG. 6D, there is not enough space to sandwich the conductive gasket 53 between the bundle line and the earth sheet metal 11. If an adhesive tape degrades with age, the conductive gasket 53 may come off the bundle line. In a case illustrated in FIG. 6D, a force to press the conductive gasket 53 against the bundle line is not exerted. Therefore, a contact characteristic between the bundle line and the conductive gasket 53 is not stabilized.

Thus, the bundle line and the conductive gasket 53 can reliably contact each other when perpendicular to each other in FIG. 6B.

The area in which the bundle line and the conductive gasket 53 contact each other becomes lager in FIG. 6B in which the two conductive gaskets 53 are used than in FIG. 6A in which the one conductive gasket 53 is used. While the conductive gasket 53 is perpendicular to the bundle line in both the example illustrated in FIG. 6A and the example illustrated in FIG. 6B, an effect of a measure against noise is higher in the example illustrated in FIG. 6B than in the example illustrated in FIG. 6A. A plurality of conductive gaskets 53 may be attached to the earth sheet metal 11. How many conductive gaskets 53 are used may be selected depending on a space for a grounding location, costs, and a noise effect.

Figure 7A:
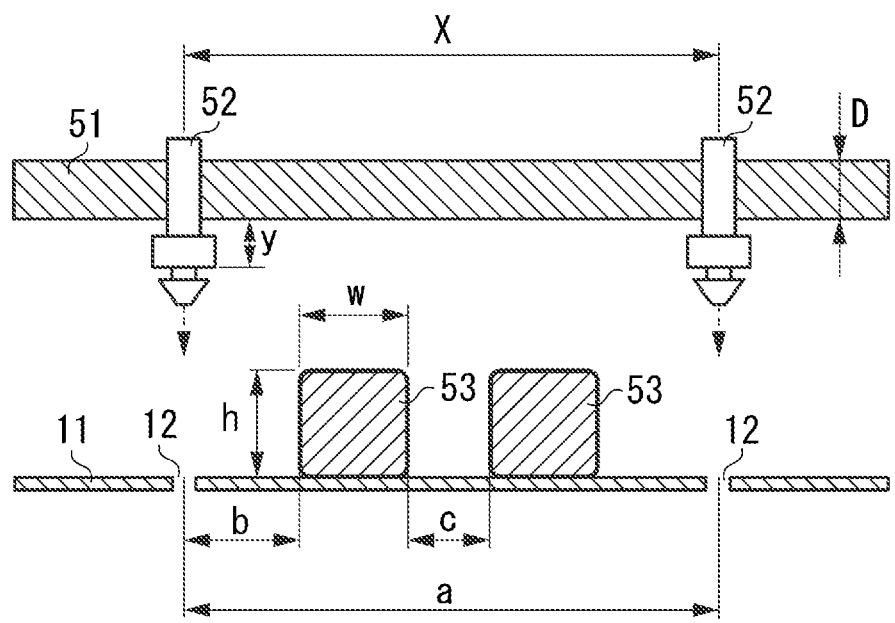
FIGS. 7A and 7B are schematic views for illustrating a positional relationship among members required to ground the electric wire according to the first exemplary embodiment.
Figure 7B:
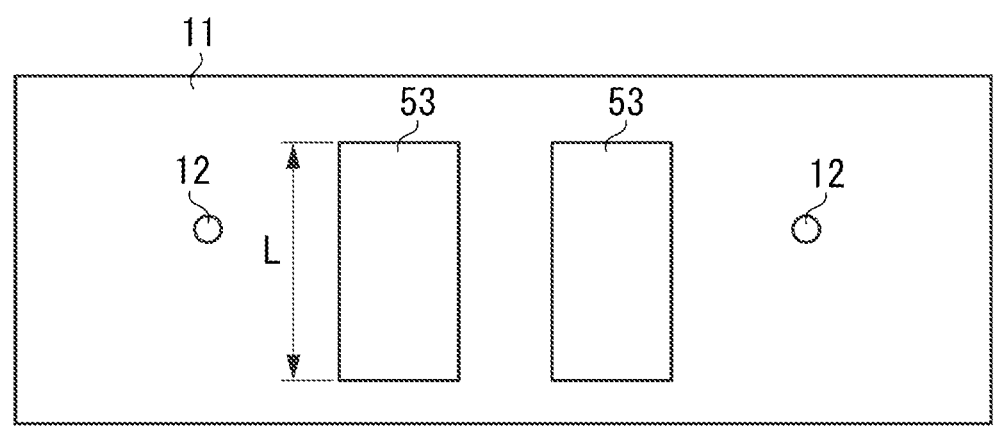

A positional relationship among members required to ground a bundle line according to the first exemplary embodiment will be described below with respect to schematic views of FIGS. 7A and 7B. FIG. 7A is a side view, and FIG. 7B is an upper perspective view.

As illustrated in FIG. 7A, the thickness h of the conductive gasket 53 is selected to be not less than the thickness y of a part of the reuse band 52, and is selected so that the conductive gasket 53 is crushed by approximately half (0.4 to 0.6). At this time, a relationship between the thickness y of the part of the reuse band 52 and the thickness of the conductive gasket 53 is expressed by the following expression (1):

$$h \geq y/\alpha \ (\alpha=0.4\sim0.6) \tag{1}$$

In the first exemplary embodiment, when y=6 mm is selected, h=10 mm is selected as an appropriate example.

If the width w of the conductive gasket 53 is smaller than the thickness h thereof, the conductive gasket 53 falls when crushed so that the conductive gasket 53 may be separated from the earth sheet metal 11. Therefore, the width w of the conductive gasket 53 is selected to be larger than the thickness h thereof. At this time, a relationship between the width w and the thickness h of the conductive gasket 53 is expressed by the following expression (2):

$$w \geq h \tag{2}$$

In the first exemplary embodiment, w=10 mm serving as an easily available general-purpose size is selected as an appropriate example.

The length L of the conductive gasket 53 is selected to be sufficiently larger than the diameter D of the bundle line and to be not less than two times the width w thereof. At this time, a relationship between the width w and the length L of the conductive gasket 53 is expressed by the following expression (3):

$$L \geq 2 \cdot w \tag{3}$$

In the first exemplary embodiment, L=30 mm is selected as an appropriate example.

10 mm or more is desirably ensured as a distance b from the hole 12 for attaching the reuse band 52 to the earth sheet metal 11 to the conductive gasket 53 so that the reuse band 52 can be detachably attached. On the other hand, when the distance b from the hole 12 to the conductive gasket 53 increases, a force to crush and press the conductive gasket 53 becomes weak. Therefore, the distance b is desirably limited to 20 mm. At this time, the distance b from the hole 12 to the conductive gasket 53 is expressed by the following expression (4):

$$20 \text{ mm} \geq b \geq 10 \text{ mm} \tag{4}$$

In the first exemplary embodiment, b=13 mm is selected as an appropriate example.

A distance c between the conductive gasket 53 and the conductive gasket 53 is determined in consideration of a crushing amount α of the conductive gasket 53. A simply crushed portion becomes a circular arc of a semicircle, and an extrusion amount of the crushed portion is the radius of the semicircle. It is assumed that the sum of the extrusion amount of the crushed portion of the conductive gasket 53 and an extrusion amount of a crushed portion of an adjacent conductive gasket 53 becomes the diameter of a circle. At this time, a relationship among the distance c between the conductive gaskets 53, the thickness h of the conductive gasket 53, and the crushing amount α of the conductive gasket 53 is expressed by the following expression (5):

$$c \geq \alpha \cdot h \tag{5}$$

In the first exemplary embodiment, c=6 mm is selected as an appropriate example.

A distance a (a predetermined distance) between the holes 12 for attaching the two respective reuse bands 52 is set to the sum of the above-described calculation results. More specifically, when one gasket 53 is used, the distance a is expressed by the following expression (6):

$$a=2b+w \quad (6)$$

When two gaskets 53 are used, the distance a is expressed by the following expression (7):

$$a=2b+2w+c \quad (7)$$

When n gaskets 53 are used, the distance a is expressed by the following expression (8):

$$a=2b+n\cdot w+(n-1)\cdot c \quad (8)$$

A distance x between the two reuse bands 52 is the distance a between the holes 12 for attaching the two reuse bands 52. More specifically, a relationship between the distance x between the two reuse bands 52 and the distance a between the holes 12 for attaching the two reuse bands 52 is expressed by the following expression (9):

$$x=a \quad (9)$$

As described above, in the first exemplary embodiment to which the present invention is applied, the conductive member is arranged to contact the ground portion electrically grounded and the electric wire attached to the ground portion by the first attachment member and the second attachment member. The conductive member is arranged between the first attachment member and the second attachment member. When the electric wire is thus grounded, an electromagnetic wave released from the electric wire can be suppressed.

Particularly when the conductive gasket 53 serving as a conductor and also an elastic member having a cushioning characteristic is used as an example of the conductive member, the electromagnetic wave released from the electric wire can be suppressed regardless of a constraint of a grounding space and a constraint of a shape of the electric ware.

In the above described first exemplary embodiment, an example in which a signal to be transmitted to a bundle line is a high-impedance signal, like the I2C signal to be transmitted to the human presence sensor bundle line 630 has been described. On the other hand, the first exemplary embodiment to which the present invention is applied is also effective for grounding a shield in an impedance control signal bundle line to fix an impedance value depending on a distance from an earth ground. The first exemplary embodiment to which the present invention is applied is also effective for grounding a shield in a signal bundle line having a low amplitude and easily affected by EMS. The first exemplary embodiment to which the present invention is applied is also effective for grounding a shield in a signal bundle line having a large signal amplitude, early switched, and easily radiating EMI.

While a method for grounding the human presence sensor bundle line 630 has been described in the above described first exemplary embodiment, the present invention is also similarly applicable to a bundle line other than the human presence sensor bundle line 630.

A method for grounding a bundle line according to a second exemplary embodiment will be described with respect to schematic views of FIGS. 8A and 8B.

Figure 8A:
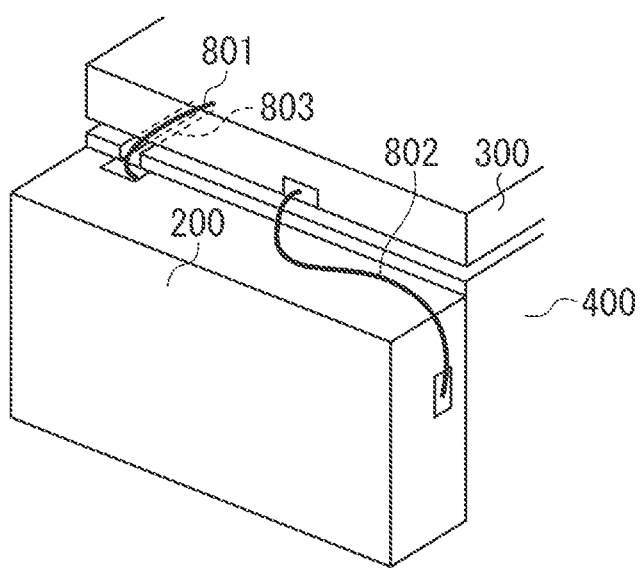
FIGS. 8A and 8B are schematic views for illustrating a method for grounding an electric wire according to a second exemplary embodiment.

FIG. 8A is a cross-sectional view illustrating a scanner unit 300 and a printer unit 400 in an MFP 10.

A groove portion 803 is a groove having a recess for passing a bundle line.

A bundle line 801 is a bundle line installed in the groove portion 803. While the scanner unit 300 in the MFP 10 is loaded on the printer unit 400, the bundle line 801 wired to an upper surface of the printer unit 400 from a main controller unit 200 is installed in the groove portion 803 not to be crushed by the scanner unit 300.

EMI generated by the main controller unit 200 may be radiated from the bundle line 801 so that shielding and grounding are required as a measure against noise.

A bundle line 802 is a bundle line for transmitting image data read by the scanner unit 300 to the main controller unit 200.

The bundle line 802 is a differential serial dataline, and includes a shield for controlling an impedance. That is, the bundle line 802 is not easily bent because it includes a shield.

Figure 8B:
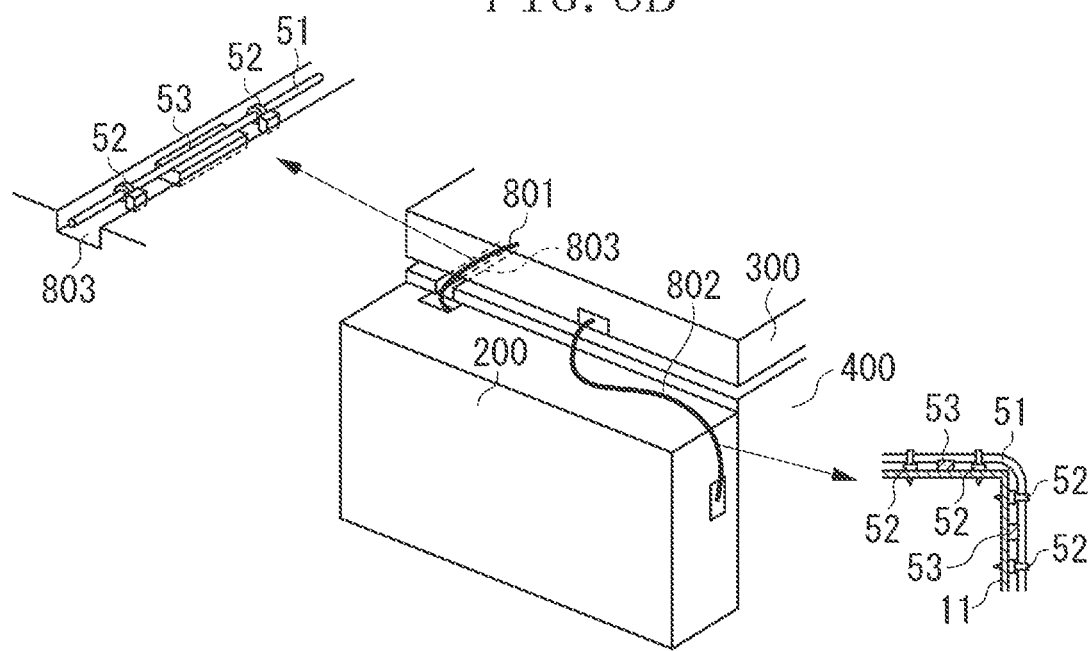

If the bundle line 802 is wired along a corner of the earth sheet metal 11, as illustrated in a schematic view of FIG. 8B, the bundle line 802 swells because it is not easily bent. Thus, if the bundle line 802 is wired along the corner of the earth sheet metal 11, the bundle line 802 separates from the earth sheet metal 11.

When a bundle line separates from the earth sheet metal 11, the bundle line is affected by EMI and EMS even if it is shielded. Thus, the bundle line needs to be brought close to the earth sheet metal 11 and grounded.

A conductive member (e.g., a conductive gasket 53) for supporting the bundle line 801 or the bundle line 802 may be arranged in a space sandwiched between a ground portion and a shielding member in the bundle line, to attach the bundle line to the ground portion using an attachment member for attaching the bundle line to the ground portion.

When the bundle line 801 is attached to the groove portion 803 and when the bundle line 802 is attached to a folded portion at the corner of the earth sheet metal 11, if an electric wire is grounded, like in the second exemplary embodiment, in a location where an attachment member is not easily added around the bundle line, an electromagnetic wave released from the electric wire can be suppressed.

Particularly when a conductive gasket 53 serving as a conductor and also an elastic member having a cushioning characteristic is used as an example of the conductive member, the electromagnetic wave released from the electric wire can be suppressed regardless of a constraint of a grounding space and a constraint of a shape of the electric ware.

Other Exemplary Embodiments

The present invention is not limited to the above described exemplary embodiments. Various modifications (including an organic combination of the exemplary embodiments) can be made based on the scope of the present invention, and are not intended to be excluded from the scope of the present invention.

While the exemplary embodiments to which the present invention is applied have been described using the MFP 10 including the scanner unit 300 and the printer unit 400, the present invention is not limited to this. The exemplary embodiments to which the present invention is applied can also be similarly described in an image processing apparatus such as a scanner not including the printer unit 400, an image forming apparatus such as a printer not including the scanner 300, and an electrical device such as a PC including neither the scanner unit 300 nor the printer unit 400.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-150513, filed Jul. 30, 2015, which is hereby incorporated by reference herein in its entirety.

What is claimed is:

1. An electrical device comprising:
    a ground portion electrically grounded;
    a conductive member which is contacted with the ground portion and is contacted with an electric wire; and
    a first attachment member and a second attachment member, wherein the first attachment member and the second attachment member attach the electrical wire to the ground portion,
    wherein the conductive member is between the first attachment member attached to the ground portion and the second attachment member attached to the ground portion, and
    wherein the electrical wire attached to the ground portion by the first attachment member and the second attachment member presses the conductive member against the ground portion.

2. The electrical device according to claim 1, further comprising a plurality of conductive members,
    wherein the plurality of conductive members are arranged a predetermined distance apart from one another between the first attachment member and the second attachment member.

3. The electrical device according to claim 2, wherein the predetermined distance is determined based on a thickness of the conductive member and a crushing amount of the conductive member.

4. The electrical device according to claim 2, wherein the predetermined distance is 6 mm.

5. The electrical device according to claim 1, wherein the conductive member is an elastic member having conductivity.

6. The electrical device according to claim 1, wherein the conductive member is a gasket having conductivity.

7. The electrical device according to claim 1, wherein the conductive member is a urethane foam having conductivity.

8. The electrical device according to claim 1, wherein the ground portion is a casing of the electrical device.

9. The electrical device according to claim 1, wherein the first attachment member and the second attachment member are respective bands for attaching the electric wire to the ground portion.

10. The electrical device according to claim 9, wherein the band is a reuse band.

11. A method for arranging a conductive member, comprising:
    arranging a conductive member which is contacted with a ground portion electrically grounded and is contacted with an electric wire, wherein a first attachment member and a second attachment member attach the electrical wire to the ground portion; and
    arranging the conductive member between the first attachment member attached to the ground portion and the second attachment member attached to the ground portion, and
    wherein the electrical wire attached to the ground portion by the first attachment member and the second attachment member presses the conductive member against the ground portion.

* * * * *